US009571279B2

(12) United States Patent
Kancharla et al.

(10) Patent No.: US 9,571,279 B2
(45) Date of Patent: Feb. 14, 2017

(54) SYSTEMS AND METHODS FOR SECURED BACKUP OF HARDWARE SECURITY MODULES FOR CLOUD-BASED WEB SERVICES

(71) Applicant: CAVIUM, INC., San Jose, CA (US)

(72) Inventors: Phanikumar Kancharla, Sunnyvale, CA (US); Ram Kumar Manapragada, Hyderabad (IN)

(73) Assignee: CAVIUM, INC., San Jose, CA (US)

( * ) Notice: Subject to any disclaimer, the term of this patent is extended or adjusted under 35 U.S.C. 154(b) by 0 days.

(21) Appl. No.: 14/723,858

(22) Filed: May 28, 2015

(65) Prior Publication Data

US 2015/0358161 A1 Dec. 10, 2015

Related U.S. Application Data

(60) Provisional application No. 62/008,112, filed on Jun. 5, 2014.

(51) Int. Cl.
*H04L 9/00* (2006.01)
*H04L 9/08* (2006.01)
*H04L 29/06* (2006.01)
*G06F 21/60* (2013.01)

(52) U.S. Cl.
CPC ............ *H04L 9/0897* (2013.01); *G06F 21/602* (2013.01); *H04L 63/0485* (2013.01); *H04L 63/06* (2013.01); *H04L 63/0823* (2013.01)

(58) Field of Classification Search
CPC ..................................................... H04L 9/0897

USPC .......................................................... 713/164
See application file for complete search history.

(56) References Cited

U.S. PATENT DOCUMENTS

| 6,553,493 | B1 | 4/2003 | Okumura et al. |
| 6,931,133 | B2* | 8/2005 | Andrews ............... H04L 9/0894 380/278 |
| 8,468,151 | B2* | 6/2013 | Branscome ....... G06F 17/30519 707/716 |
| 2007/0110244 | A1* | 5/2007 | Sood ....................... H04L 63/06 380/270 |
| 2014/0282936 | A1* | 9/2014 | Fitzgerald ............... H04L 63/10 726/6 |

* cited by examiner

*Primary Examiner* — Longbit Chai
(74) *Attorney, Agent, or Firm* — Duane Morris LLP; David T. Xue

(57) ABSTRACT

A new approach is proposed to support secured hardware security module (HSM) backup for a plurality of web services hosted in a cloud to offload their key storage, management, and crypto operations to the HSM. Each HSM is a high-performance, FIPS 140-compliant security solution for crypto acceleration of the web services. Each HSM includes multiple partitions isolated from each other, where each HSM partition is dedicated to support one of the web service hosts/servers to offload its crypto operations via a HSM virtual machine (VM) over the network. The HSM-VM is configured to export objects from the key store of a first HSM partition to a key store of a second HSM partition, wherein the second HSM partition is configured to serve the key management and crypto operations offloaded from the web service host once the objects exported from the key store of the first HSM partition are received.

27 Claims, 10 Drawing Sheets

SYSTEMS AND METHODS FOR SECURED BACKUP OF HARDWARE SECURITY MODULES FOR CLOUD-BASED WEB SERVICES

CROSS-REFERENCE TO RELATED APPLICATIONS

This application claims the benefit of U.S. Provisional Patent Application No. 62/008,112, filed Jun. 5, 2014, and entitled "Method And System For Cloud-Based Web Service Security Management Based On Hardware Security Modules (HSMs)," which is incorporated herein in its entirety by reference.

This application is related to co-pending U.S. patent application Ser. No. 14/299,739, filed Jun. 9, 2014 and entitled "Systems and Methods for Cloud-Based Web Service Security Management Based on Hardware Security Modules," which is incorporated herein in its entirety by reference.

This application is related to co-pending U.S. patent application Ser. No. 14/662,012, filed Mar. 18, 2015 and entitled "Systems and Methods for Secured Hardware Security Module Communication with Web Service Hosts," which is incorporated herein in its entirety by reference.

This application is related to co-pending U.S. patent application Ser. No. 14/667,238, filed Mar. 24, 2015 and entitled "Systems and Methods for Secured Key Management via Hardware Security Module for Cloud-Based Web Services," which is incorporated herein in its entirety by reference.

This application is related to co-pending U.S. patent application Ser. No. 14/723,999, filed May, 28, 2015 and entitled "Systems and Methods for High Availability of Hardware Security Modules for Cloud-Based Web Services," which is incorporated herein in its entirety by reference.

BACKGROUND

As service providers increasingly host their web services (e.g., web sites) at third party data centers in the cloud such as Amazon Web Services (AWS) and Google Sites, security and key management for these web services hosted at the third party data centers has become an important issue. The crypto operations such as RSA, encryption and decryption operations required for secured communications with these web services consume a lot of CPU cycles and computing resources at the servers hosting the web services and are preferred to be offloaded to a separate module dedicated to that purpose.

Hardware security modules (HSMs) are physical computing devices that safeguard and manage keys for strong authentication and provide crypto processing capabilities. Each HSM traditionally comes in the form of a plug-in card or an external device that attaches directly to a computer or network server to offload key management and crypto operations from the server. However, hardware offloading is not always available especially for the web services hosted at third party data centers because most servers at the data centers do not have hardware RSA accelerators. In addition, some hypervisor products for running virtual machines on the servers, such as vSphere by VMWare and Hyper-V by Microsoft, do not support non-networking single root I/O virtualization (SR-IOV), which enables a device to separate access to its resources among various Peripheral Component Interconnect (PCI) Express (PCIe) hardware functions, and thus making them very difficult to provide hardware offloading for crypto operations. Therefore, there is a need for an improved system and method to provide secured key management for cloud-based web services hosted at a third party data center via HSMs.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
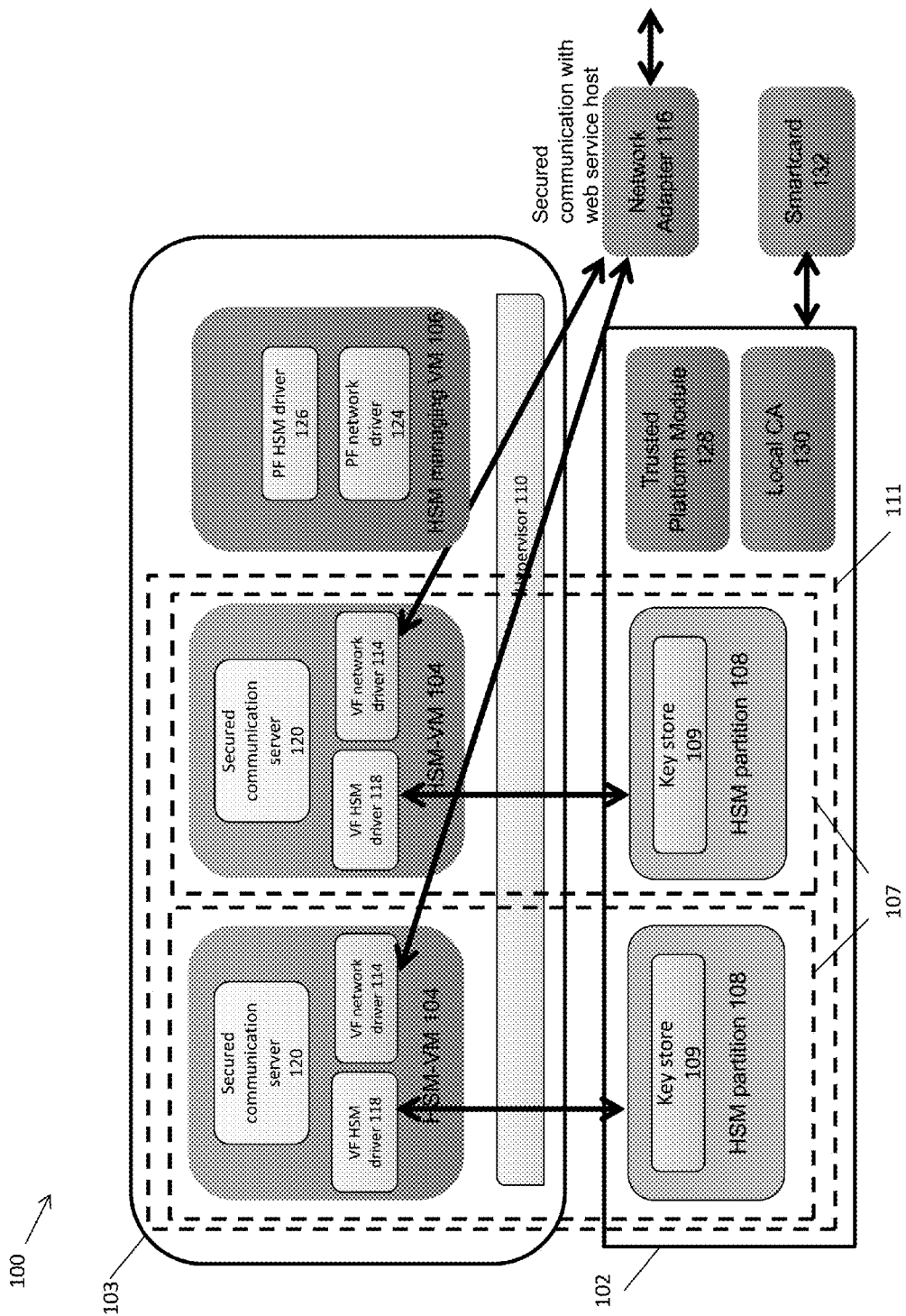
FIG. 1 depicts an example of a diagram of system 100 to support crypto operation offloading and acceleration for cloud-based web services via an HSM in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support secured hardware security module (HSM) backup for a plurality of web services hosted in a cloud to offload their key storage, management, and crypto operations to the HSM. Each HSM is a high-performance, Federal Information Processing Standards (FIPS) 140-compliant security solution for crypto acceleration of the web services. Specifically, each HSM can be a hardware/firmware multi-chip embedded cryptographic module/adapter, which provides cryptographic functionalities including but not limited to key management, modular exponentiation, random number generation, and hash processing, along with protocol-specific instructions to support various security protocols. Each HSM includes multiple partitions isolated from each other, where each HSM partition is dedicated to support one of the web service hosts/servers to offload its crypto operations via one of a plurality of HSM virtual machine (VM) over the network. The HSM-VM is configured to export a plurality of objects from the key store of a first HSM partition to a key store of a second HSM partition, wherein the second HSM partition is configured to serve the key management and crypto operations offloaded from the web service host once the objects exported from the key store of the first HSM partition are received.

The proposed approach enables web service providers hosting their web services at a third-party data center to offload its key management and crypto operations to one or more cloud-based HSMs to save computing resources on the hosts of the web services. Importantly, the keys and credentials of each web service are kept in a FIPS 140-2 compliant secured environment on the HSMs, which is accessible only by the web service and the corresponding HSM dedicated to serve the web service host. Not even the third-party data center that hosts the web service is able to access keys and data contained in the HSM. Such an approach enables the offloading of the key management and crypto operations of the web service providers so they can be accomplished in a highly secured manner.

FIG. 1 depicts an example of a diagram of system 100 to support crypto operation offloading and acceleration for cloud-based web services via a hardware security module (HSM). Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a hardware security module (HSM) appliance or HSM 102, a plurality of HSM virtual machines (HSM-VMs) 104, an HSM managing VM 106, and a trusted platform module (TPM) 128. In some embodiments, the HSM 102 is a multi-chip embedded hardware/firmware cryptographic module having software, firmware, hardware, or another component that is used to effectuate a purpose. The HSM-VMs 104, the HSM managing VM 106 typically run on a network accessible multi-tenant computing unit/appliance/host 103 that is certified under Federal Information Processing Standard (FIPS) for performing secured cryptographic operations. The computing unit/appliance/host 103 comprises one or more of a CPU or microprocessor, a memory (also referred to as primary memory) such as RAM, and a storage unit such as a non-volatile memory (also referred to as secondary memory) with software instructions stored in for practicing one or more processes. When the software instructions are executed, at least a subset of the software instructions is loaded into memory, and the computing unit becomes a special purpose computing unit for practicing the processes. When implemented on a general-purpose computing unit, the computer program code segments configure the computing unit to create specific logic circuits. The processes may alternatively be at least partially embodied in a digital signal processor formed of application specific integrated circuits (ASIC) for performing the processes. For non-limiting examples, the host 103 can be a computing device, a communication device, a storage device, or any electronic device, wherein the computing device can be but is not limited to a laptop PC, a desktop PC, a mobile device, or a server machine such as an x86 server, and the communication device can be but is not limited to a mobile phone.

In the example of FIG. 1, each of the HSM 102, the HSM-VMs 104, and the HSM managing VM 106 has a communication interface (as described below), which is a component that enables the components to communicate with each other and other devices/hosts/servers over a network (not shown) following certain communication protocols such as TCP/IP protocol. Such network can be but is not limited to, internet, intranet, wide area network (WAN), local area network (LAN), wireless network, Bluetooth, WiFi, mobile communication network, or any other network type. The physical connections of the network and the communication protocols are well known to those of skill in the art.

Figure 2:
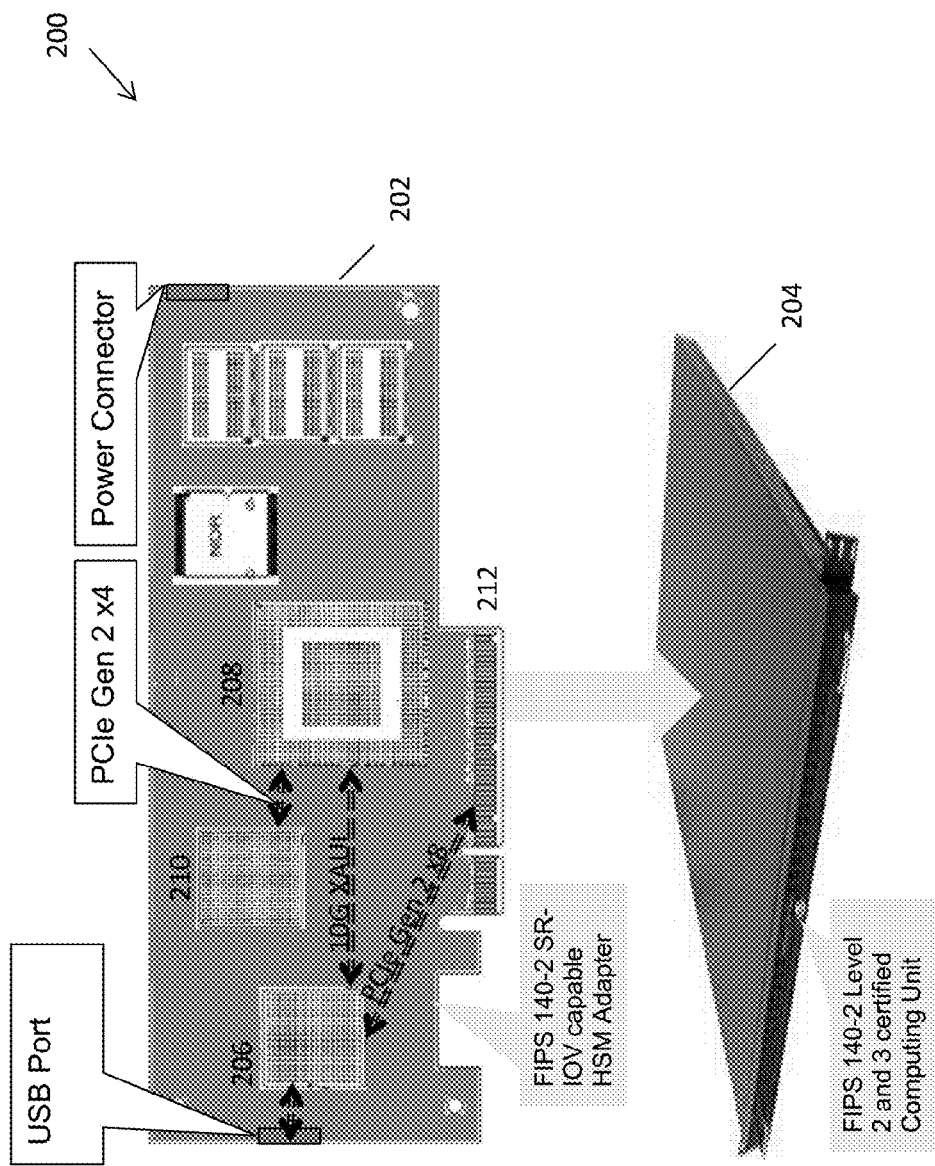
FIG. 2 depicts an example of hardware implementation 200 of the system 100 depicted in FIG. 1 for cloud-based web service security management via the HSM in accordance with some embodiments.

FIG. 2 depicts an example of hardware implementation 200 of the system 100 depicted in FIG. 1 for cloud-based web service security management via HSM. As shown in the example of FIG. 2, the FIPS-certified HSM appliance 200 includes an FIPS 140-2 Level 2 and 3 certified computing unit 204, having one or more CPUs, RAM, and storage unit and is configured to run multiple (e.g., up to 32) virtual machines such as the HSM-VMs 104, and the HSM managing VM 106. The HSM appliance 200 further includes a FIPS-certified SR-IOV-capable HSM adapter 202, which is a hardware security appliance for the HSM 102. As shown in the example of FIG. 2, the HSM adapter 202 further includes an SR-IOV PCIe bridge 206 connecting the HSM adapter 202 to the CPU in the computing unit 204 via a first PCIe connection (e.g., PCIe Gen2 x8), wherein PCIe is a high-speed serial computer expansion bus standard designed to support hardware I/O virtualization to enable maximum system bus throughput, low I/O pin count and a small physical footprint for bus devices. The bridge 206 is further configured to connect to a multi-core processor 208 (e.g., a multi-core MIPS64 processor such as OCTEON CN6130) of the HSM adapter 202 across a high speed communication interface (e.g., 10G XAUI Interface). The HSM adapter 202 further includes a security processor 210 (e.g., NITROX CNN3560) via a second PCIe connection (e.g., PCIe Gen 2 x4), wherein the security processor 210 is configured to enable cryptographic acceleration by performing crypto operations with hardware accelerators and embedded software implementing security algorithms. In some embodiments, the HSM appliance 200 is supplied and preconfigured with default network and authentication credentials so that the HSM appliance 200 can be FIPS/Common Criteria/PCI compliant for crypto offloads as well as key and certificates storage.

In the example of FIG. 1, the HSM 102 implemented via the HSM adapter 202 is configured to provide a FIPS 140-2 overall Level 3 certified security solution to a plurality of web service providers/hosts by offloading key storage and cryptographic operations of the web service hosts. For a non-limiting example, the encryption/decryption key management is for symmetric and/or asymmetric (e.g., RSA) keys and the crypto operations to be accelerated are for cryptographic protocols such as Transport Layer Security (TLS) and/or Secure Sockets Layer (SSL) designed to provide communication security over the Internet. As shown in FIG. 2, the HSM adapter 202 of the HSM 102 is physically connected to the computing unit 204 running the HSM-VMs 104 and the HSM managing VM 106 via a PCIe slot 212 in order to interact with and to provide high speed crypto acceleration to the web service hosts in a secure manner. The cryptographic functionalities provided by the HSM 102 include but are not limited to modular exponentiation, random number generation, and hash processing, along with protocol-specific instructions to support various security protocols such as TLS/SSL via the security processor 210 embedded in the HSM adapter 202. These cryptographic functionalities provided by the HSM 102 can be accessed by other components of system 100 via an Application Programming Interface (API) defined and provided by the HSM 102.

In some embodiments, the HSM 102 can be further divided into multiple HSM partitions 108, where each HSM partition 108 is dedicated to support key and security credential management and to perform crypto operations offloaded from a web service provider/host over a network via its corresponding HSM-VM 104 with one or more crypto acceleration units of pre-configured values, and a dedicated key store 109 discussed in details below. In some embodiments, the HSM partitions 108 are soft partitions created by the HSM managing VM 106 (discussed in details below) utilizing firmware of the HSM 102 and its hardware implementations (e.g., HSM adapter 202). In some embodiments, the HSM 102 can support up to a certain number (e.g., 32) HSM partitions 108 in an active state of operation, while the rest of the HSM partitions 108 on the HSM 102 are in an inactive state. Once the number is reached, one or more HSM partition 108 has to be moved from the active state to the inactive state in order for another HSM partition 108 to be moved to the active state to serve its user/web service host. In some embodiments, one or more of the HSM partitions 108 can be consolidated and moved from one HSM 102 to another.

In the example of FIG. 1, each HSM-VM 104 and its corresponding HSM partition 108 form an HSM service unit 107, which communicates with and offloads secured key management and crypto operations from a specific user/web service host. Here, each HSM partition 108 has a one-to-one correspondence with the HSM-VM 104 in the same HSM service unit 107, wherein the HSM partition 108 interacts with and allows access only from the HSM-VM 104 in the HSM service unit 107. In some embodiments, a unique static secret (e.g., 12-byte long) is configured and assigned to each HSM-VM 104 during initialization of the system 100 and its drivers. Every subsequent request to an HSM partition 108 from the HSM-VM 104 in the same HSM service unit 107 is then checked against the static secret assigned to the particular HSM-VM 104 as well as a dynamic secret (e.g., 8-byte long) provided in real time during the interacting process between the HSM partition 108 and the HSM-VM 104.

In some embodiments, each HSM service unit 107 supports and requires identity-based authentication for operations by a set of users/web service hosts as required by the FIPS 140-2 level 3. Each of the users can access the HSM service unit 107 to manage it and/or to offload key management and computer intensive crypto operations to it. One of the users serves as an administrator to create and initialize the HSM service unit 107 with a set of policies via the HSM managing VM 106 as discussed in details below. Other users include at least one web service host, which logs in to an HSM service unit 107 with credentials via the corresponding HSM VM 104 of the HSM service unit 107. In some embodiments, each user/web service host who wants to login to and access the HSM service unit 107 to offload its crypto operations via the corresponding HSM-VM 104 should provide the HSM service host 107 with a valid certificate in order to access the HSM service host, wherein the certificate is issued by a trusted certificate authority (CA) 130 during the request to create the HSM service unit 107. In some embodiments, the user/web service host needs to supply the HSM service unit 107 with a complete chain of CA certificates, which are all active and have not been revoked.

In some embodiments, each HSM service unit 107 permits a different set of API calls for different types of commands, wherein types of commands made available by the HSM service unit vary based on the type of user logged into the HSM service unit 107 and some API calls do not require any user identification or login. For a non-limiting example, the administrator via the HSM managing VM 106 may utilize a set of commands to initialize and manage (e.g., create, delete, backup, restore) the HSM service units 107, while the web service host may utilize a different set of commands for key management and crypto acceleration via the HSM service unit 107.

In some embodiments, each HSM partition 108 of an HSM service unit 107 includes a key store 109 configured to accept and store various types of objects for authentication and/or crypto operations of the corresponding web service host. Here, the objects include but are not limited to secured authentication credentials, user generated/imported keys, certificates of the web service host, and configurations for the corresponding HSM-VM 104 served by the HSM partition 108. Here, all the keys, passwords and/or credentials stored in the key store 109 are maintained in an isolated and tamper proof environment, e.g., FIPS 140-2 Level 3 certified hardware implementation of the HSM 102 (e.g., HSM adapter 202), with nothing being stored anywhere else (e.g., the host 103 of the HSM-VMs 104) in the system 100. In some embodiments, the objects are encoded and encrypted via an encryption key before being stored in the key store 109, wherein the encryption key is unique for each key store 109. Consequently, no entity (e.g., other web service hosts) except the web service provider/host can have access (e.g., read/write) to the authentication credentials to the key store 109 of the HSM partition 108 via its corresponding HSM-VM 104.

In some embodiments, each HSM service unit 107 is identified using a unique HSM ID, which is a string generated with one or more of Appliance Serial Number of the HSM Adapter 202, MAC address of the network adapter 116 of the host 103, domain name of the web service host (e.g., the name used in the certificate) and any user provided string. In some embodiments, each object stored in the key store 109 is identified and can be accessed with a unique key handler, wherein the key handler along with the HSM ID forms a global unique identifier for the object. When a web service host accesses a corresponding HSM service unit 107 using its HSM ID, the key handler is sufficient to uniquely identify each object in the key store 109 of the HSM partition 108. In some embodiments, an object moving from one HSM partition 108 to another HSM partition 108 may not get the same identifier, unless both HSM partitions are configured to be in the same high availability (HA)/backup domain.

In some embodiments, the key store 109 of each HSM partition 108 is configured to support object operations including but not limited to generating, deleting, finding, importing, exporting, and creating of the objects in the key store 109. Here, each object is stored in the key store 109 along with its attributes, which include but are not limited to timestamps, user, exportable, usage, etc. Object flags may also be adopted to define the usability of the object for wrapping, exporting, signature generation, verification, etc. The key store 109 checks every object for validity (e.g., date and time) based on the stored attributes before using the object for crypto operations. In some embodiments, the key store 109 performs consistency checks when an object is created or imported to avoid storing invalid objects/keys in the key store 109. In some embodiments, the key store 109 supports retrieving and modifying of selected attributes of the objects in the key store 109.

In some embodiments, when the HSM 102 imposes a limit on the number of keys in the key store 109 (e.g., at about 50K keys) in each HSM partition 108 of an HSM service unit 107, a set of HSM service units 107 can be connected together to form a so-called "elastic" HSM set 111, which extends the sizes of their key stores 109 seamlessly by combining the key stores 109 to be accessed as one elastic key store. Here, the HSM service units 107 need not be on same HSM 100, and different HSM service units 107 running on different HSMs 100 can connect to each other logically and form an elastic HSM set 111. Each HSM service unit 107 in the elastic HSM set 111 is identified with an id SET_ID, wherein the first HSM service unit 107 in the elastic HSM set 111 is the base HSM service unit and the rest are the extended HSM service units. By default, every HSM service unit 107 is in a singleton elastic HSM set 111 with its SET_ID set to 0, wherein the set can be extended when required.

During operations, all HSM service units 107 in the elastic HSM set 111 are provided to the user/web service host as a single logical HSM service unit having the combined key store. In some embodiments, the key handler of each object in the elastic HSM set 111 is formed as SET_ID|| key handler in the local key store 109 in the form of a mapping table. As such, the size of the combined key store for the elastic HSM set 111 can be increased or decreased dynamically with a supported minimum size by including or removing one or more HSM service units 107 in the elastic HSM set 111. In some embodiments, the size of the key store for the elastic HSM set 111 can be reduced by merging HSM service units 107 when all keys in the key store 109 of one HSM service unit 107 can be moved to a different HSM service unit 107 in the set. The key handler of each object also needs to be updated during a merge of the HSM service units 107. The HSM service units 107 in the elastic HSM set 111 are initialized and managed via the HSM managing VM 106 via admin APIs as discussed below, wherein any operation on the base HSM service unit is also performed on the extended HSM service units.

In some embodiments, the configuration of the elastic HSM set 111 having multiple HSM service units 107 is made transparent to the user/web service host, where only the base HSM service unit in the elastic HSM set 111 is exposed to the user via its HSM-VM 104. Under such scenario, extended HSM service units in the elastic HSM set 111 would accept connections only from the base HSM service unit, not directly from the user. The user/web service host can only communicate with the base HSM service unit for requests for key management and crypto operations, and the base HSM service unit can offload such received requests to the extended HSM service units via the back channel as necessary.

In some embodiments, the user is aware of the configuration of the elastic HSM set 111 having multiple HSM service units 107 and it can communicate with and offload its key management and crypto operations directly to the extended HSM service units in the elastic HSM set 111 without passing through the base HSM service unit for scalability and performance. Under such scenario, the base HSM service unit needs to copy user credentials onto each extended HSM service unit in the elastic HSM set 111 and the mapping of the key handler of each object in the elastic HSM set 111 is provided to the user for access to the key stores of the HSM service units. In some embodiments, key management operations are centrally managed by the base HSM service unit.

Figure 3:
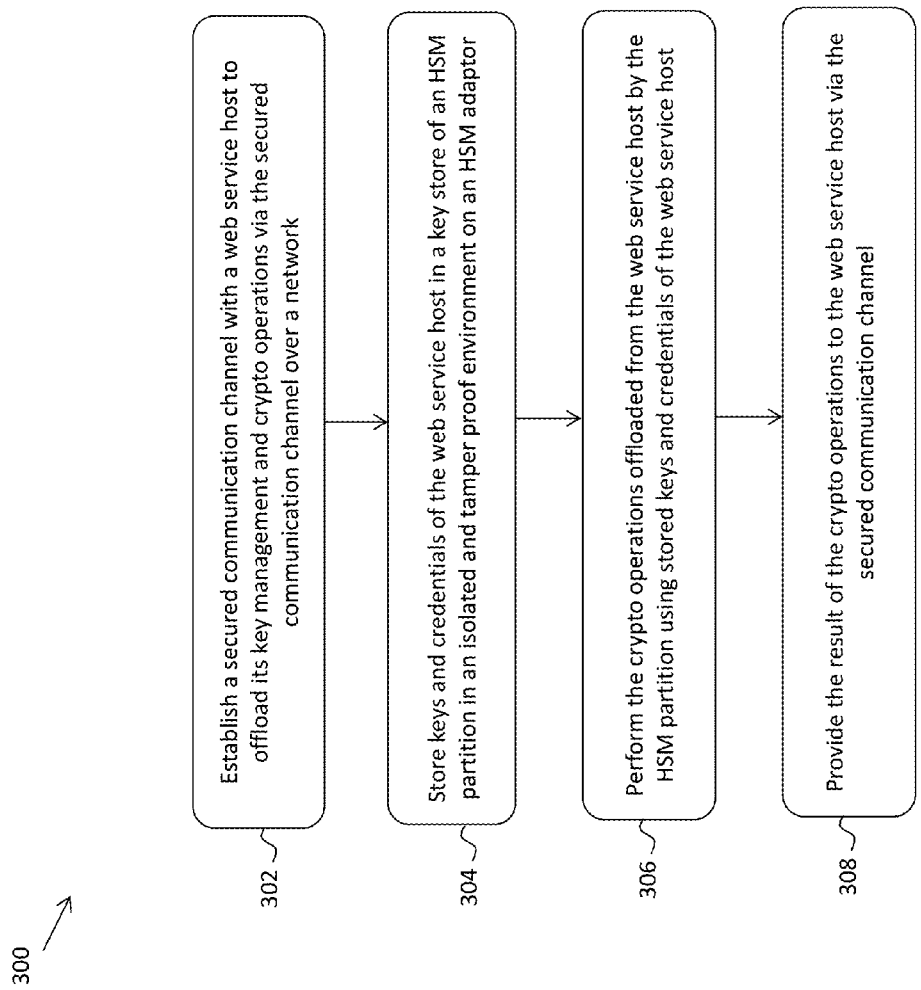
FIG. 3 depicts a flowchart of an example of a process to support secured key management and crypto operations for cloud-based web services in accordance with some embodiments.

FIG. 3 depicts a flowchart of an example of a process to support secured key management and crypto operations for cloud-based web services. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302, where a secured communication channel is established with a web service host over a network to offload its key management and crypto operations via the secured communication channel. The flowchart 300 continues to block 304, where keys and credentials of the web service host are stored in a key store of an HSM partition in an isolated and tamper proof environment on an HSM adapter. The flowchart 300 continues to block 306, where the crypto operations offloaded from the web service host are performed by the HSM partition using stored keys and credentials of the web service host. The flowchart 300 ends at block 308, where the result of the crypto operations is provided to the web service host via the secured communication channel.

In the example of FIG. 1, each HSM-VM 104 of an HSM service unit 107 is configured to interact with a web service provider/host via secured communication channels to enable the web service provider/host to authenticate itself in order to offload its key management and crypto operations of the web service provider/host to a specific HSM partition 108 of the HSM 102 dedicated to the HSM-VM 104. The HSM-VMs 104 run on top of a hypervisor 110, which runs the HSM-VMs 104 and HSM managing VM 106 on the host 103. The hypervisor presents each VM with a virtual operating platform and manages the execution of each VM on the host 103. Each HSM-VM 104 is a software implementation that executes programs to emulate a computing environment such as an operating system (OS). The duration of the communication channel/session between the HSM-VM 104 and the web service provider/host varies with every login attempt by the web service provider/host and the secured communication channel can only be established following a successful secured handshake between the web service provider/host and the HSM-VM 104. In some embodiments, the dynamic secret used to authenticate the HSM-VM 104 to the HSM partition 108 is also generated following the establishment of the secured communication channel.

In some embodiments, each HSM-VM 104 contains one or more of the following software components: a secured OS (e.g., Security Enhanced Linux or SE-Linux), a virtual function (VF) network driver 114 configured to interact with a physical network adapter/card 116 of the host 103 to receive and transmit communications (e.g., packets) dedicated to the specific HSM-VM 104, and a VF HSM driver 118 configured to interact with an HSM partition 108 of the HSM 102 dedicated to the specific HSM-VM 104 and to set up a request/response communication path between the HSM-VM 104 and the HSM partition 108. The VF HSM driver 118 of the HSM-VM 104 and the HSM partition 108 of the HSM 102 communicate with each other through a SR-IOV PCIe bridge as discussed above, and each communication takes place in a FIPS-compliant way. As referred to herein, a VF driver is a lightweight PCIe function associated with the PCIe Physical Function (PF) on a network adapter (e.g., network adapter 116) that supports single root I/O virtualization (SR-IOV) and represents a virtualized instance of the network adapter. Each VF shares one or more physical resources on the network adapter, such as an external network port, with the PF and other VFs.

In some embodiments, the HSM-VMs 104 running on the same hypervisor 110 on the host 103 are isolated from each other and one HSM-VM 104 cannot access data/communication of any other HSM-VMs 104. During communication, packets received by the VF network driver 114 of an HSM-VM 104 from the physical network adapter 116 are filtered via a static destination MAC address, which is unique for each VF driver and cannot be changed/configured by the VF driver. The MAC address is delivered directly to the VF network driver 114 of the HSM-VM 104 based on SR-IOV mapping. When transmitting a packet from the HSM-VM 104, the VF network driver 114 directly puts the packet into a hardware queue, which is sent out of the physical network adapter 116 without the packet touching the host side or any other HSM-VMs 104 running on the same host 103.

In some embodiments, each HSM-VM 104 further includes a secured communication server 120 (e.g., a TurboSSL accelerated thin server) configured to establish the secured communication channel between the HSM-VM 104 and a server/host of a web service provider over a network via provided SSL/TLS functions to allow the web service provider secured access to the HSM partition 108. To ensure the secured communication, the secured communication server 120 adopts certificate-based mutual authentication between the HSM-VM 104 and the web service host and uses a restricted cipher set with the highest security. The secured communication channel is established by the secured communication server 120 using mutually authenticated SSL session. In some embodiments, RSA-based certificates are used for mutual authentication. The cipher set supported by the secured communication server 120 prevents forward secrecy and attacks against block cipher chaining over the secured communication channel.

During its operation, the secured communication server 120 of the HSM-VM 104 opens a session with its corresponding HSM partition 108 in the same HSM service unit 107. The secured communication server 120 listens for connection requests from a user/web service provider. For each new request received from the user, the secured communication server 120 establishes a secured communication channel with the web service provider, wherein the secure channel acts to communicate all requests from the user. The user needs to provide login credentials (e.g., domain name, certificate, user ID and password, etc.) required to authenticate itself to the HSM-VM 104 and the HSM partition 108 and is only allowed to issue non-privileged requests (e.g., request for information of the HSM partition 108 until its login credentials are authenticated by the HSM-VM 104. In some embodiments, all parties in the communication will have a certificate issued by an authorized local Certification Authority (CA) discussed in details below. Similarly each web service host can have its own local CA to support multiple users. The secured communication server 120 verifies the received login credentials including the user supplied certificate for domain and role correctness. Once the web service provider is authenticated, the secured communication server 120 then converts the request into a command to offload key management and crypto (e.g., RSA) operations from the web service host to the corresponding HSM partition 108 and/or to save private keys to the key store 109 in the HSM partition 108 via the HSM-VM 104. In some embodiments, the HSM-VM 104 offloads the crypto operations to an x86 Advanced Encryption Standard (AES) engine running on the HSM partition 108 for performance optimization. After the commands from the user have been processed by the HSM partition 108, the secured communication server 120 returns the results back to the user over the network through the secured communication channel. In some embodiments, the user can keep track of its commands to the HSM-VM 104 using request IDs, which are communicated to the HSM-VM 104 and sent back along with the response.

In some embodiments, the secured communication server 120 of the HSM-VM 104 is configured to create multiple secured communication channels having different security strengths with different users based on their types. In some embodiments, the secured communication server 120 supports multiple concurrent sessions with multiple users to access the HSM-VM 104 over the network. For non-limiting examples:

An administrator of the system 100 is required to provide certified key pair (discussed in details below) in order to establish the secured communication channel through which the administrator can issue management commands to the HSM VMs 104 and the HSM partitions 108.

A user/web service host is required to provide key-pair generated during creation of the HSM partition 108 and the certificates of the user's domain in order to be able to offload crypto operations to the HSM partition 108 and to access its key store 109.

In some embodiments, the secured communication server 120 is configured to establish a secured communication channel between the web service host and a smart card configured to perform a number of offloaded crypto operations (e.g., minimum of 2048-bit RSA operations and 256-bit AES operations). In some embodiments, the secured communication server 120 either supports the elastic HSM set 111 having multiple HSM service units 107 in a transparent mode or exposes the HSM service units 107 as multiple units to support web service hosts.

In some embodiments, the secured communication server 120 is configured to utilize one or more libraries provided by the HSM-VM 104 to offload requests/responses for the key management and crypto operations of the user/web service host to its corresponding HSM partition 108 via the secured communication channel, wherein the libraries can either be an external engine following Public-Key Cryptography Standards (PKCS), e.g., a PKCS#11 engine, or a patch to OpenSSL. In some embodiments, all requests and responses over the secured communication channel are in asynchronous mode so the user/web service provider may block/poll on the corresponding network port. In some embodiments, requests/responses from multiple users/web service hosts can be tunneled to the same HSM service units 107. In some embodiments, the secured communication server 120 is configured to accept and apply configuration parameters of the secured communication channel in the form of a configuration file, wherein the parameters include but are not limited to partition hostname/IP-addresses, cipher suite, SSL rekey time, path to the key handle files, default reconnection time, scheduling parameters, etc.

In the example of FIG. 1, the TPM 128 running on the HSM 102/HSM adapter 202 is configured to provide authenticity and integrity for the service hosts 107. The TPM 128 provides a pair of persistent (public and private) keys certified and installed during the production of the HSM adapter 202, wherein this key pair cannot be read, modified or zeroized by any other party. The TPM 128 is configured to utilize the key pair to develop the local certification authority (CA) 130 and its certificates to extend the authenticity and integrity to the HSM service units 107 including both the HSM-VM 104 and HSM partition 108 to mitigate the impersonation attacks to the system. During its operation, the TPM 128 is only accessible by the internal management module of the HSM adapter 202. Without this otherwise non-accessible TPM 128, an attacker having a certificate (with serial number of the HSM adapter 202 embedded in it) and/or the private key in its hand can impersonate the system 100 and run cloning kind of security protocols on any arbitrary machine and see the keys in clear format. In some embodiments, each HSM service unit 107 can also be configured to communicate with another trusted HSM service unit 107 via a back channel to minimize impersonations in addition to the certificate based authentication.

In the example of FIG. 1, the local CA 130 is a software module of the operating system (e.g., Security Enhanced Linux or SE-Linux) of the HSM 102 and is established by the TPM 128 to extend the source authenticity and integrity features to each HSM service unit 107 of the system 100. In some embodiments, the local CA 130 includes at least the following two types of certificates:
  HSM certificate: which includes the HSM ID for a specific HSM service 107. The certificate also specifies one or more of the user role, the domain name, and the purpose it can be used for (e.g., backup, user authorization, etc.).
  Backup certificate: which can be used for backup/cloning purposes. Optionally, a different key pair and certificate can be included in the backup certificate to isolate any security breach.
Here, the certificates in the local CA 130 are verified to be trustworthy. In some embodiments, the local CA 130 may also perform quick authentication of a certificate by comparing a user supplied certificate to trusted certificate in the local CA 130.

Figure 4:
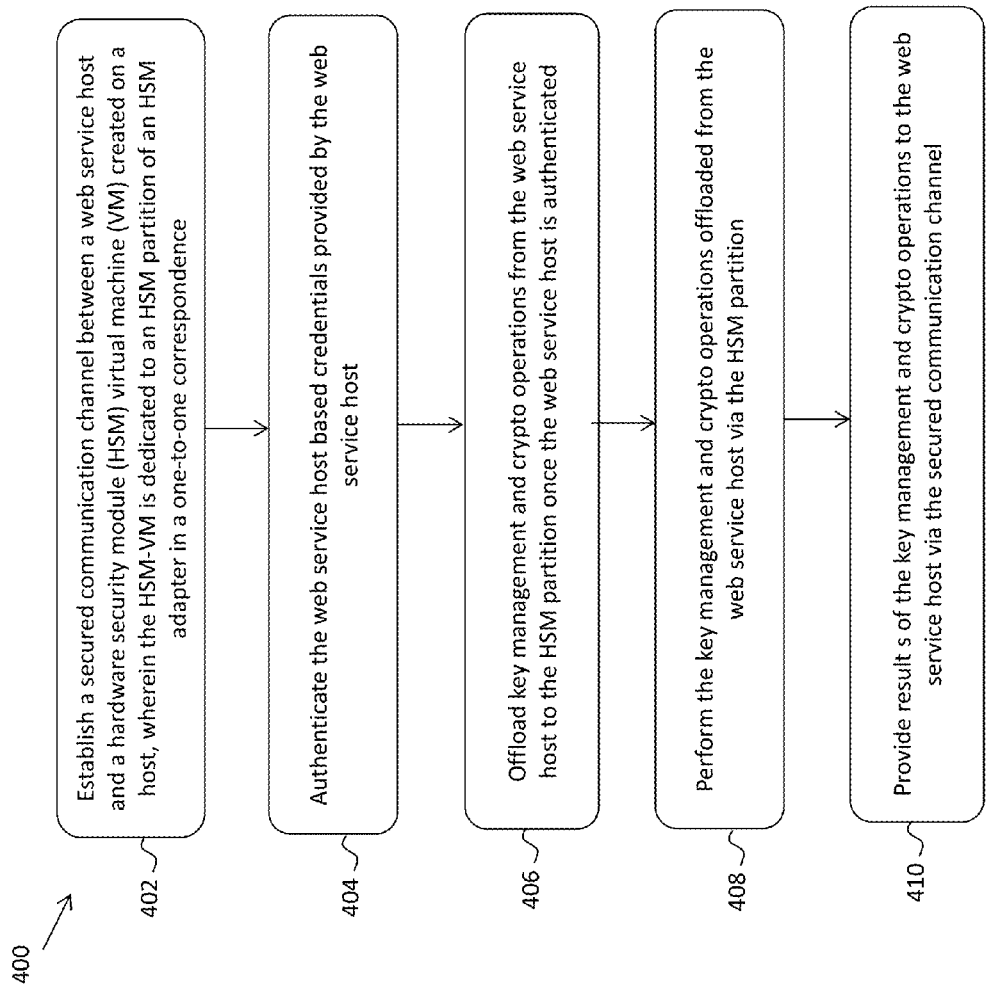
FIG. 4 depicts a flowchart of an example of a process to support secured communication for crypto operation offloading and acceleration for cloud-based web services in accordance with some embodiments.

FIG. 4 depicts a flowchart of an example of a process to support secured communication for crypto operation offloading for cloud-based web services. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 4, the flowchart 400 starts at block 402, where a secured communication channel is established between a web service host and a hardware security module (HSM) virtual machine (VM) created on a host, wherein the HSM-VM is dedicated to an HSM partition of an HSM adapter in a one-to-one correspondence. The flowchart 400 continues to block 404, where the web service host is authenticated based on its provided credentials. The flowchart 400 continues to block 406, where key management and crypto operations are offloaded from the web service host to the HSM partition once the web service host is authenticated. The flowchart 400 continues to block 408, where the key management and crypto operations offloaded from the web service host are performed via the HSM partition. The flowchart 400 ends at block 410, where results of the key management and crypto operations are provided to the web service host via the secured communication channel.

In the example of FIG. 1, the HSM managing VM 106 is configured to serve in an administrator role to manage (e.g., create, delete, backup, restore) the plurality of HSM service units 107 including both the HSM-VMs 104 and their corresponding HSM partitions 108 as well as various devices utilized by the HSM-VMs 104. Specifically, the HSM managing VM 106 determines the number of active HSM partitions 108 within the HSM 102, loads drivers for the various devices (e.g., physical network adapters 116 and the HSM 102) used to communicate with the HSM partitions 108, launches and monitors HSM-VMs 104 dedicated to the HSM partitions 108, and handles critical/management updates for the various devices. In some embodiments, the HSM managing VM 106 runs a secured OS (e.g., Security Enhanced Linux or SE-Linux) 122. In some embodiments, the HSM managing VM 106 includes a physical function (PF) network driver 124 configured to initialize the physical network adapters/cards 116 used by the VF network drivers 114 of the HSM-VMs 104 to communicate with their respective web service providers. As referred to herein, a PF driver is a PCIe function on a network adapter (e.g., network adapter 116) that supports SR-IOV interface. The PF driver is used to configure and manage the SR-IOV functionality of the network adapter such as enabling virtualization and exposing PCIe VFs.

In some embodiments, the HSM managing VM 106 further includes a PF HSM driver 126 configured to setup and initialize the HSM 102 for operating its HSM partitions 108 with the VF HSM drivers 118 of the HSM-VMs 104. The PF HSM driver 126 performs an initial handshake and establishes a request/response communication channel with the HSM 102. The PF HSM driver 126 identifies the number of active HSM partitions 108 in the HSM 102 and passes it to the HSM managing VM 106. If there are active HSM partitions 108 on the HSM 102, the HSM managing VM 106 checks the integrity of corresponding VM images, creates the plurality of HSM-VMs 104 each dedicated to one of the HSM partitions 108, and uses the commands available to initialize the HSM 102 and manage the HSM partitions 108 of the HSM 102. If no active HSM partition is available in the HSM 102, the HSM managing VM 106 launches no HSM-VM 104. The HSM managing VM 106 may subsequently create and/or remove HSM-VM 104 based on the number of HSM partitions available in the HSM 102 and/or the number of web service providers requesting to offload key management and crypto operations.

In some embodiments, the HSM managing VM 106 initializes each HSM partition 108 of an HSM service unit 107 with required policies and user accounts once the HSM service unit 107 is created. When an HSM service unit 107 is created, its HSM partition 108 is initialized and tied to a domain of a web service host using a certificate. In addition, a default user account is created and a key pair for creating the secured communication channel is generated by the TPM 128 along with its certificate. Here, the default user is a local user of the HSM partition 108 and its credentials are maintained in the HSM partition 108 and are never sent out the FIPS boundary of the HSM appliance 200. These credentials are only used for automatic key backup and internal crypto-offloads and are not exposed to the user/web service provider so that it cannot login with these credentials. During operation, HSM-VM 104 passes the credentials it received from a web service host to its HSM partition 108 during login, wherein the HSM partition 108 compares the received credentials against its stored values to determine whether to allow the user to offload its crypto and/or key management operations.

During its operation, the HSM managing VM 106 creates an HSM service unit 107 for a user/web service host based on the user's domain certificate, performance requirements and network configuration. The HSM managing VM 106 then checks if the requested performance configuration (e.g., key store size and crypto operations/sec) is available. If so, the HSM managing VM 106 creates an HSM partition 108 of the HSM service unit 107 with the required storage and assigns crypto cores of the HSM partition 108 per the requested performance. The HSM managing VM 106 generates and saves required pair of persistent keys and certificate for identification of the HSM service unit 107 as well as a storage encryption key for encrypting the persistent keys in the key store 109 of the HSM partition 108. The HSM managing VM 106 also creates an HSM VM 104 of the HSM service unit 107 with the provided network access details such as an IP address and part of a hostname. Finally, the HSM managing VM 106 starts the HSM service unit 107 by making it available to the user/web service host to offload its key management and crypto operations when both the created HSM VM 104 and the HSM partition 108 are ready.

While the system 100 depicted in FIG. 1 is in operation, the HSM managing VM 106 communicates with the HSM 102 to identify the number of active HSM partitions 108 available in the HSM 102. The HSM managing VM 106 then creates a plurality of HSM service units 107, wherein each of the HSM-VMs 104 in an HSM service unit 107 is dedicated to and has a one-to-one correspondence with the corresponding HSM partition 108 in the HSM service unit 107 following proper authentication. The HSM managing VM 106 also initializes a plurality of network adapters/cards 116 used by the HSM-VMs 104 to communicate with web service providers. During its operation, each HSM-VM 104 establishes a secured communication channel with a web service host for receiving and transmitting packets of requests and data from and to the web service host. When an HSM-VM 104 receives a request from the web service host via its network adapter 116, the HSM-VM 104 converts the request into a command for the HSM 102 and passes the command to the HSM partition 108 dedicated to serve the HSM-VM 104 and the web service host. The dedicated HSM partition 108 maintains encryption/decryption keys as well as other credentials for the web service host in a FIPS 140-2 Level 3 certified environment. The HSM partition 108 further performs crypto operations including but not limited to key generations and bulk data encryption/decryption operations offloaded from the web service host. The HSM partition 108 then provides the results of the key and/or crypto operations back to the web service host through the secured communication channel established by the HSM-VM 104 via the network adapter 116.

Figure 5:
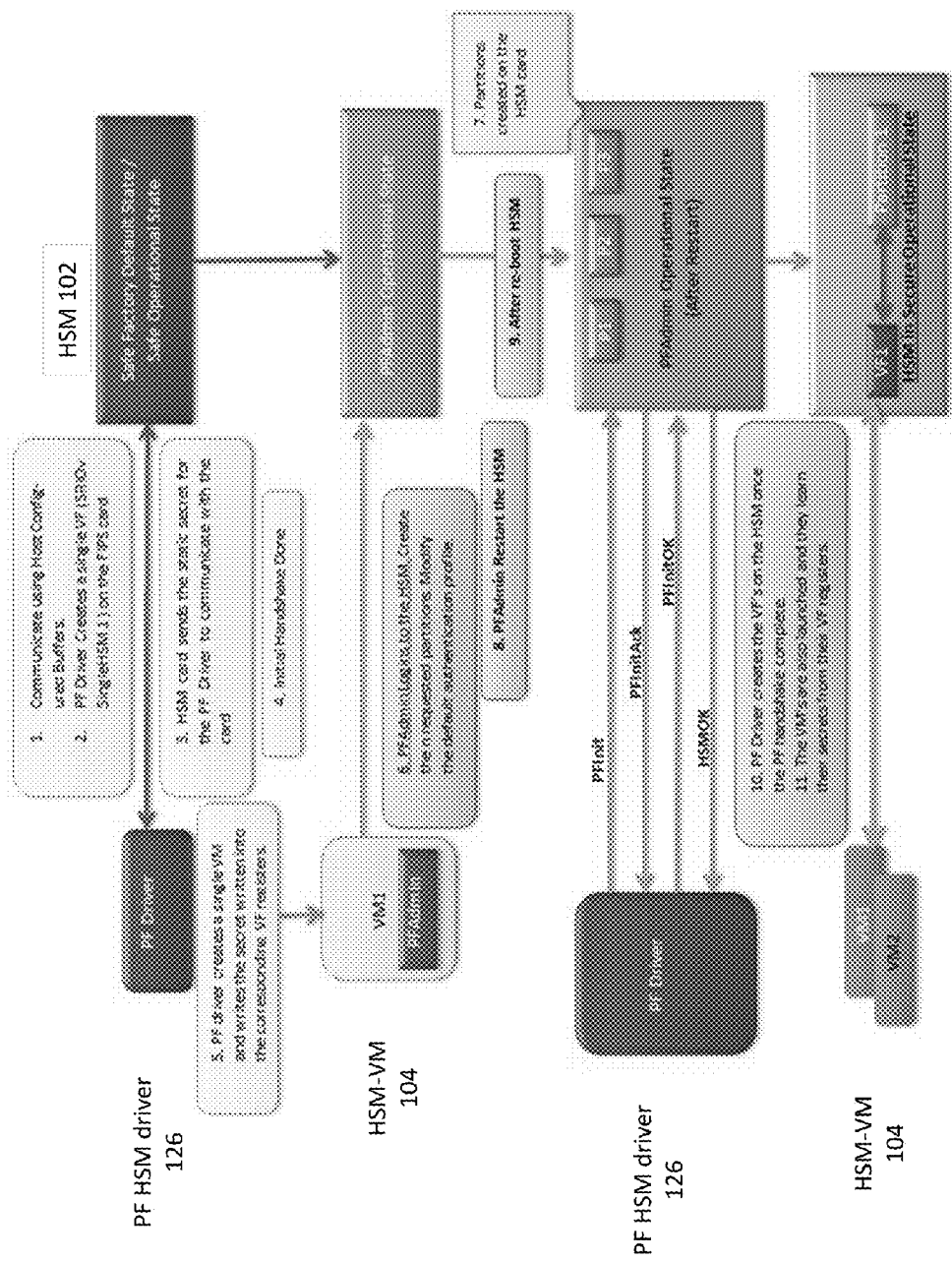
FIG. 5 depicts a diagram of an example of a process flow for the HSM to move from an initial reset state to an operational state in accordance with some embodiments.
Figure 6:
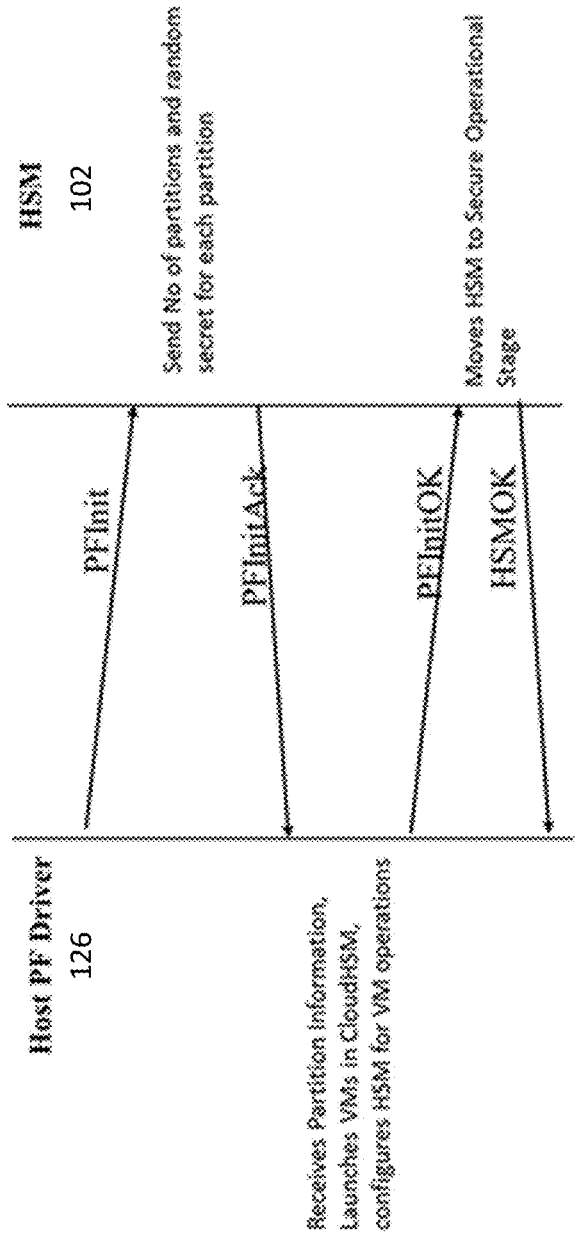
FIG. 6 depicts a diagram of an example of a four-way handshake between a PF HSM driver and the HSM in accordance with some embodiments.

FIG. 5 depicts a diagram of an example of a process flow for the HSM 102 to move from an initial reset state to an operational state. Upon powering on, the HSM 102 moves through various states before it becomes accessible by HSM-VMs 104 to perform any cryptographic operations. The HSM 102 is in Safe Factory Default state when it is powered up for the very first time. When the HSM 102 is in this state or PFAdmin Operational state, where the HSM managing VM 106 creates the HSM partitions 108, the HSM 102 defines a messaging protocol that the PF HSM driver 126 of the HSM managing VM 106 follows to move the HSM 102 to a Secure Operational state and all communication between the PF HSM driver 126 and the HSM 102 takes place through host-configured buffers. FIG. 6 depicts a diagram of an example of a four-way handshake between the PF HSM driver 126 and the HSM 102. As part of the communication, the number of the HSM partitions 108 are provided to the HSM managing VM 106. The PF HSM driver 126 receives the number of the HSM partitions 108 and launches the plurality of HSM-VMs 104 in one-to-one correspondence with the HSM partitions 108. Also as part of this communication, the PF HSM driver 126 communicates one static secret per HSM partition 108 to each HSM-VM 104 to be used for authentication with the HSM partition 108. This static secret is configured on the HSM 102 for the specific HSM partition 108 and it cannot be read by another HSM partition 108. Once this exchange completes, the HSM 102 moves to Secure Operational state, where it is ready to perform key management and crypto operations.

Figure 7:
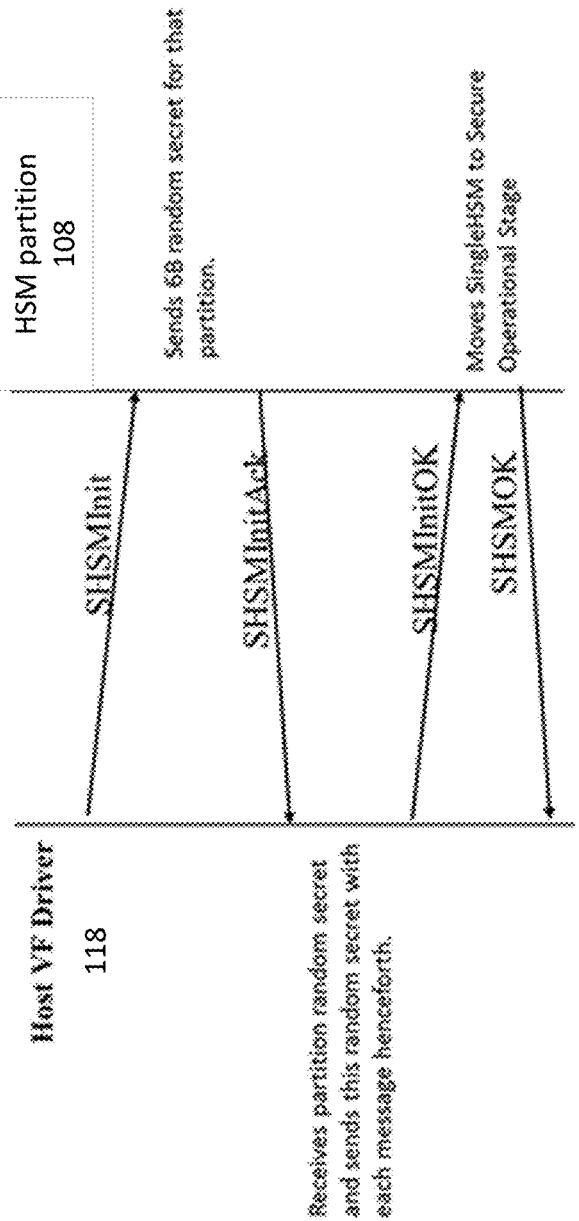
FIG. 7 depicts a diagram of an example of a four-way handshake between a VF HSM driver and the HSM partition in accordance with some embodiments.

Similarly, each HSM-VM 104 and its corresponding HSM partition 108 also move from an initial reset state to an operational state, where the partition 108 can be accessed by its HSM-VM 104 for various cryptographic operations. The HSM-VM 104 is in HSM Partition (or SingleHSM) Default state when the HSM 102 is being initialized by the HSM managing VM 106 for the first time. When in HSM Partition Default or HSM Partition Operational state, where the VF HSM driver 118 of the HSM-VM 104 has yet to initialize the HSM partition 108, the HSM 102 defines a messaging protocol that the VF HSM driver 118 follows to move the HSM partition 108 to Secure Operational state and all handshake communication between the VF HSM driver 118 and the HSM partition 108 takes place through VF-configured buffers. FIG. 7 depicts a diagram of an example of a four-way handshake between the VF HSM driver 118 and the HSM partition 108. As part of this handshake mechanism, a portion of a static secret is exchanged, which, in conjunction with the secret exchanged with the PF HSM driver 126 discussed above, forms a static secret that cannot be read by any other HSM partition 108. Once this exchange completes, the HSM-VM 104 moves to HSM Partition Secure Operational state, where the HSM-VM 104 work with its corresponding HSM partition 108 to perform key management and crypto operations offloaded from a web service host to the HSM-VM 104.

In the example of FIG. 1, an HSM VM 104 is configured to import one or more pre-existing keys and credentials from a user/web service host as objects into the key store 109 of its corresponding HSM partition 108 in the same HSM service unit 107 that serves the key management and crypto operations offloaded from the web service host. The HSM VM 104 is also configured to export/copy/backup objects (e.g., keys and other objects) from the key store 109 of its corresponding HSM partition 108 currently serving the offloaded key management and crypto operations to a key store 109 of another HSM partition 108 running on the same or a different HSM 102/HSM adapter 202. Here, importing and exporting keys and other objects to and/or from the key store 109 of the HSM partition 108 can be used for key backup and restore among the HSM partitions 108 running on the same or a different HSM adapter 202. Once the objects are received by the key store 109 of the other HSM partition 108, the other HSM partition 108 is configured to serve the key management and crypto operations offloaded from the web service host. In some embodiments, the other HSM partition 108 is configured to serve the offloaded key management and crypto operations independently or together with the current HSM partition 108 through the same HSM VM 104. In some embodiments, exporting the objects from the key store 109 of the current HSM partition 108 is made transparent to the web service host being served by the current HSM partition 108.

In some embodiments, the HSM VM 104 is configured to import objects (e.g., keys and credentials) to the key store 109 of its corresponding HSM partition 108 with pre-assigned handlers for the objects. Such key handlers for the objects are used to identify and access the objects in the key store 109 and are updated when the objects are moved (imported and/or exported) from one key store 109 to another as discussed above.

In some embodiments, the HSM VM 104 is configured to import and/or export objects to and/or from the key store 109 of its corresponding HSM partition 108 either on per object basis wherein only a subset of selected objects in the key store 109 of the HSM partition 108 are imported or exported, or on per partition basis wherein all objects in the key store 109 of the HSM partition 108 are imported or exported. In some embodiments, the objects in the key store 109 are imported and/or exported along with their attributes stored in the key store 109.

In some embodiments, the HSM VM 104 is configured to wrap/encrypt the objects before they are imported to or exported from its corresponding HSM partition 108 and to unwrap/decrypt the objects after they have been imported and/or exported to their destination (a key store 109 in an HSM partition 108 or an external storage as discussed below). In some embodiments, the objects/keys are wrapped/encrypted with FIPS approved encryption key referred to as the key backup key (KBK), which for a non-limiting example, can be a 256-bit AES key. Here, the KBK is securely generated via a FIPS approved key exchange mechanism during a mutually authenticated secured communication session between the HSM VM 104 and the user/web service host as discussed above.

In some embodiments, the HSM VM 104 is configured to utilize a FIPS approved smartcard 132 to store the KBK used to encrypt/decrypt the objects in the key store 109 and to block all un-authorized access to the KBK by other VMs and/or users. Keeping the KBK safe and secure is crucial since all objects/keys are encrypted/decrypted using the KBK. In some embodiments, the smartcard 132 is a programmable Java card loaded with one or more applets capable of running FIPS approved key exchange algorithms. As shown in the example of FIG. 1, the smartcard 132 communicates with the HSM 102/HSM adapter 202 using the certificate created by TPM 128 as discussed above. Note that the smartcard 132 does not need be connected to HSM appliance at all time as communication can happen over the network as well. In some embodiments, the smartcard 132 is configured to maintain multiple KBKs for different key stores 109 and their HSM partitions 108 on different HSMs 102.

In some embodiments, the smartcard 132 may further include one or more of a private key and a certificate of the user/web service host. During the initialization or user creation of the HSM service unit 107, a certificate of the user/web service host is submitted and the user/web service host make sure that the corresponding private key is only available on the smartcard 132. During a user login the HSM service unit 107 sends a challenge data to the user, which will then process the challenge using the private key stored in the smartcard 132 and respond back to the HSM service unit 107. The challenge response mechanism is done in the same secured communication channel used for login as discussed above. Such mechanism enables the user/web service host to pass authentication information to the HSM service unit 107 over the network.

In some embodiments, the HSM VM 104 is configured to delete and/or archive the objects from the key store 109 of its current HSM partition 108 after the objects have been exported from the key store 109. A single Application Programming Interface (API) provided by the HSM 102 may be utilized to delete and/or archive the objects from the key store 109.

In some embodiments, the HSM VM 104 is configured to export/transmit the objects from the key store 109 of its current HSM partition 108 to the key store 109 of the HSM partition 108 of their destination over a network under a key communication protocol, which can be but is not limited to, Key Management Interoperability Protocol (KMIP).

In some embodiments, the HSM VM 104 is configured to clone, backup and/or restore the objects from the key store 109 of its corresponding HSM partition 108 to and/or from an external storage (not shown), instead of or in addition to exporting the objects to the key store 109 of another HSM partition 108. Here, the external storage is either locally attached to the HSM 102/HSM adapter 202 of the HSM partition 108 or remotely accessible over a network. Here, the external storage can be a non-volatile (non-transient) storage device, which can be but is not limited to, a solid-state drive (SSD), a static random-access memory (SRAM), a magnetic hard disk drive (HDD), and a flash drive. During the backup and/or restore operation, the HSM VM 104 is configured to utilize methods and APIs for importing and exporting keys and objects to and/or from the key store 109 of the HSM partition 108 as described above.

In some embodiments, the HSM VM 104 is configured to utilize a back (communication) channel to export/transfer the objects from the key store 109 of a primary HSM partition 108 on a first HSM 102/HSM adapter 202 to a backup HSM partition 108 on a second HSM 102/HSM adapter 202 and/or to the external storage for cloning, backup, and restoring operations. Such back channel runs in parallel to the secured communication channel between the secured communication server 120 of the HSM VM 104 and the web service host and may utilize the same or a different network adapter 116. In some embodiments, there can be as many a number of back channels established as HSM partitions 108 available on HSM 102/HSM adapter 202. In some embodiments, when there are multiple backup HSM partitions available, the network of back channels from the primary HSM partition 108 on the first HSM 102 to the secondary/standby HSM partitions 108 form a star-like topology model, where the primary HSM partition 108 is configured to establish secured back channels for communication with each of the secondary HSM partitions 108 to import and/or export objects/keys from/to the secondary HSM partitions 108. Here, the objects being exchanged over the back channels are encrypted and are never shared with other HSM partitions 108.

Figure 8:
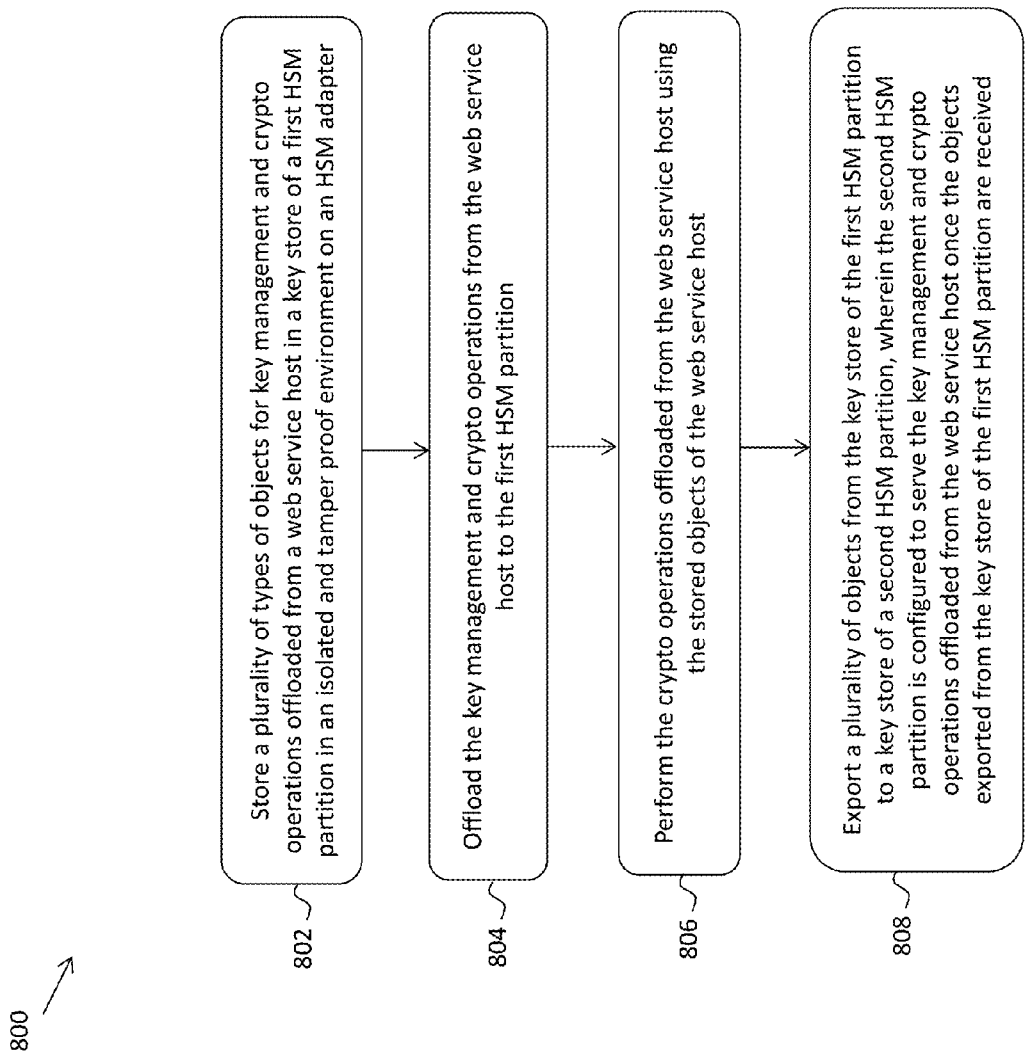
FIG. 8 depicts a flowchart of an example of a process to support secured HSM backup for cloud-based web services in accordance with some embodiments.

FIG. 8 depicts a flowchart of an example of a process to support secured hardware security module (HSM) backup for cloud-based web services. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 8, the flowchart 800 starts at block 802, where a plurality of types of objects for key management and crypto operations offloaded from a web service host are stored in a key store of a first HSM partition in an isolated and tamper proof environment on an HSM adapter. The flowchart 800 continues to block 804, where the key management and crypto operations are offloaded from the web service host to the HSM partition. The flowchart 800 continues to block 806, where the crypto operations offloaded from the web service host are performed using the stored objects of the web service host. The flowchart 800 ends at block 808, where a plurality of objects are exported from the key store of the first HSM partition to a key store of a second HSM partition, wherein the second HSM partition is configured to serve the key management and crypto operations offloaded from the web service host once the objects exported from the key store of the first HSM partition are received.

Figure 9:
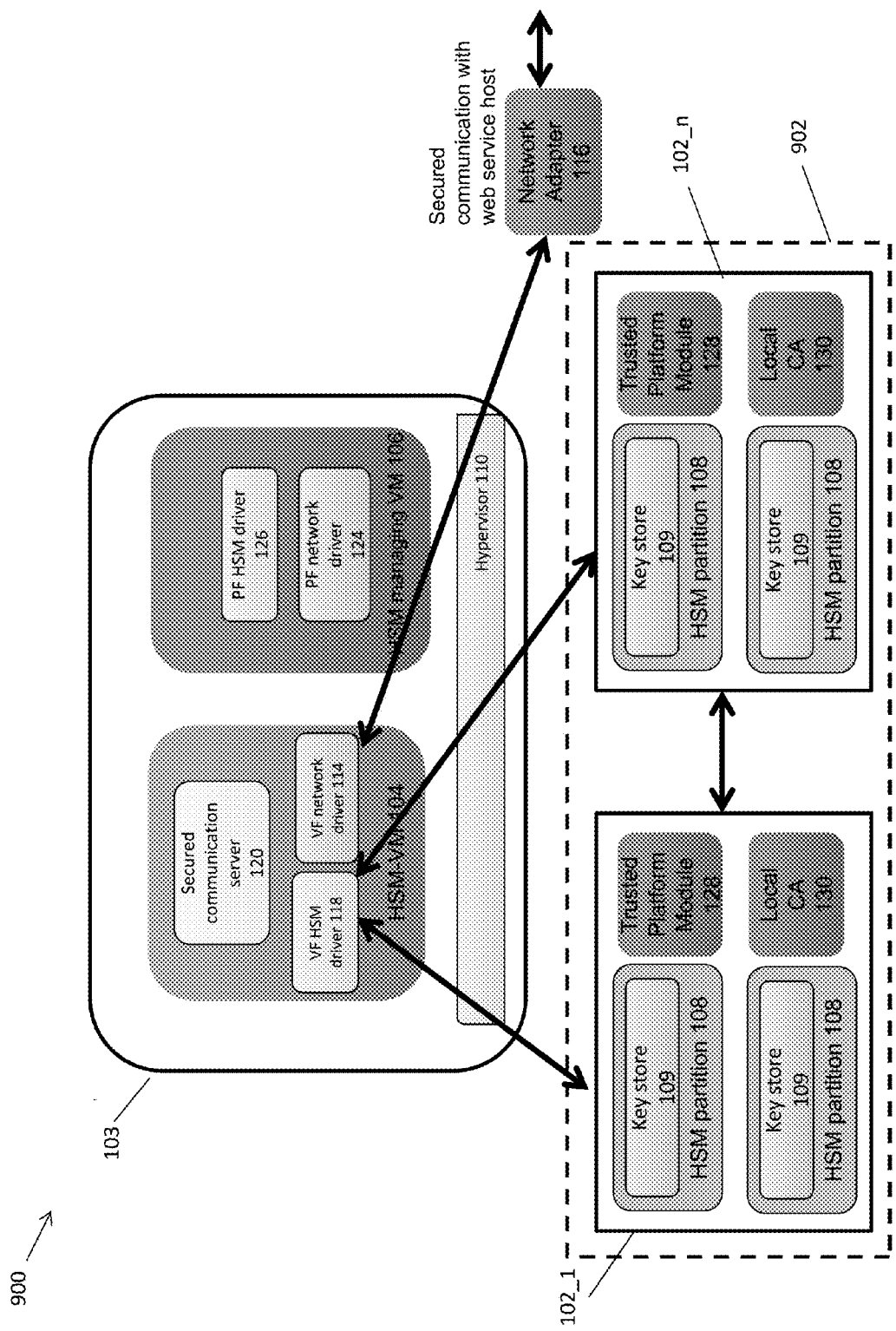
FIG. 9 depicts an example of a diagram of system 900 to support high availability (HA) of HSMs for key management and crypto operations for cloud-based web services in accordance with some embodiments.

FIG. 9 depicts an example of a diagram of system 900 to support high availability (HA) of HSMs for key management and crypto operations for cloud-based web services. As shown in FIG. 9, there are a plurality of HSM 102s (102_1, . . . , 102_n), each running on a FIPS-certified SR-IOV-capable HSM adapter 202 and each having a plurality of HSM partitions 108 running on it, wherein each of the HSM partition 108 has a key store 109 configured to support secured key management and crypto operation offloading for a web service host via an HSM-VM 104 as discussed above. The set of HSMs 102_1, . . . , 102_n form an HSM HA domain/set 902, wherein all of the HSM partitions 108 running on the HSMs 102 in the HSM HA domain 902 are active and are accessible by the user/web service host via their corresponding HSM VMs 104 to offload and balance its key management and crypto operations. In some embodiments, the HSM partitions 108 running on different HSMs 102 in the HSM HA domain 902 are configured to communicate with each other over one or more back channels as discussed above. In some embodiments, the HSM service units 107 that each includes both the HSM partition 108 and its corresponding HSM VM 104 as shown in FIG. 1 are also configured to support HA, wherein the HSM VMs 104 are duplicated and deployed over the same or different hosts 103s (in addition to the HSM partitions 108 running on different HSMs 102s) for HA support of the HSM service units 107.

In the example of FIG. 9, the HSM managing VM 106 is configured to utilize the HSM 102s and their HSM partitions 108 in the HSM HA domain 902 to support load balancing of the crypto operations offloaded from the user/web service host. In some embodiments, one of the HSM partitions 108 on an HSM 102 in the HSM HA domain 902 is designated as the primary HSM partition, while the rest of the HSM partitions 108 running on the HSMs 102 in the HSM HA domain 902 are designated as the secondary HSM partitions 108. During a load balancing operation, the HSM managing VM 106 is configured to monitor load information on crypto operations currently being performed among the HSM partitions 108 running on the same HSM 102 or on a different HSM 102 in the HSM HA domain 902. In some embodiments, the load information on the key management and crypto operations is monitored by and provided to the HSM managing VM 106 either via push notifications by the HSM partitions 108 or by polling from the HSM partitions initiated by the HSM managing VM 106. If the HSM managing VM 106 determines that the primary HSM partition 108 currently serving the offloaded crypto operations from the web service host is overloaded based on the collected load information, the HSM managing VM 106 then identifies one or more secondary HSM partitions 108 running either on the same HSM 102 as the primary HSM partition 108 or on a different HSM 102 in the HSM HA domain 902 and distributes at least a portion of the crypto operations from the primary HSM partition 108 to the identified secondary HSM partitions 108.

In some embodiments, the primary HSM partition 108 is configured to maintain information/entries of the secondary HSM partitions 108 that share its loads in the same HSM HA domain 902, wherein such information includes but is not limited to network access details such as hostname and IP address of the secondary HSM partitions 108. In some embodiments, the secondary HSM partitions 108 are configured to serve the offloaded key management and crypto operations independently or together with the primary/first HSM partition 108 through the same HSM VM 104.

In some embodiments, only the primary HSM partition 108 is accessible by the web service host via a secured communication channel via its HSM-VM 104. In some embodiments, the key store 109 of the primary HSM partition 108 is solely responsible in the HSM HA domain 902 for maintaining the objects/keys for the web service host. The primary HSM partition 108 is further configured to create and/or delete objects/keys in the key store 109. In some embodiments, the primary HSM partition 108 is configured to automatically update and synchronize its key store 109 with the rest of the secondary HSM partitions in the HSM HA domain 902 so that all HSM partitions 108 in the same HSM HA domain 902 are in sync with respect to their key stores 109, which all have the same objects with the same key handles as well as attributes associated with the objects. In some embodiments, the HSM managing VM 106 is configured to utilize a secured key exchange mechanism to generate a shared Key Masking Key (KMK) to encrypt the objects/keys in the key store 109 of the primary HSM partition 108 before they are synchronized/transmitted to the secondary HSM partitions 108 running on a different HSM 102/HSM adapter 202 from the primary HSM partition 108.

In some embodiments, the HSM managing VM 106 is configured to adjust the configuration of the HSM HA domain 902 dynamically by adding and/or removing one or more HSM partitions 108 currently not serving the web service host to and/or from the HSM HA domain 902. When a new HSM partition 108 is added to the HSM HA domain 902, the HSM managing VM 106 designates it as a secondary HSM partition 108 and copies the key store 109 of the primary HSM partition 108 to the newly added secondary HSM partition 108. When a secondary HSM partition 108 is removed from the HSM HA domain 902, the HSM managing VM 106 also deletes information/entries of the secondary HSM partition 108 from the primary HSM partition 108. When a primary HSM partition 108 is removed from the HSM HA domain 902, the HSM managing VM 106 first pauses all key management and crypto operations currently being performed by the primary HSM partition 108 and downgrades the primary HSM partition 108 to a secondary HSM partition 108. The HSM managing VM 106 then designates one of the secondary HSM partitions as the new primary HSM partition 108 and deletes the downgraded secondary HSM partition 108 from the HSM HA domain 902.

In case the primary HSM partition 108 fails, the HSM managing VM 106 is notified by its corresponding HSM-VM 104. The HSM managing VM 106 is configured to identify a secondary/standby HSM partition 108 as the new primary HSM partition 108 to replace the failed primary HSM partition 108. The HSM managing VM 106 then reinitiates a secured connection with the new primary HSM partition 108, which will assume all object/key operations for the web service host currently being served.

In some embodiments, the HSM managing VM 106 is configured to clone and/or replicate some or all HSM partitions 108 on one HSM 102_i to another HSM 102_j in the same HSM HA domain 902. During the replication, some or all HSM partitions 108 and their key stores 109 are exported from HSM 102_i and created on the HSM 102_j as discussed above. In some embodiments, objects (e.g., credentials and keys) of the user/web service host are restored in the key stores 109 of the HSM partitions 108 on the HSM 102_j, wherein the HSM managing VM 106 exports the credentials from the HSM 102_i as one or more separate blobs and passes them to the HSM 102_j while creating the HSM partitions 108 on the HSM 102_j. In some embodiments, the newly created HSM partitions 108 having the credentials are initially in a deactivated state, which have to be activated by the administrator via the HSM managing VM 106 before becoming accessible by the web service host. In some embodiments, the HSM managing VM 106 is configured to clone and/or replicate the HSMs 102 via a back channel as discussed above, which authenticates the HSMs 102 to prevent impersonation attack.

Figure 10:
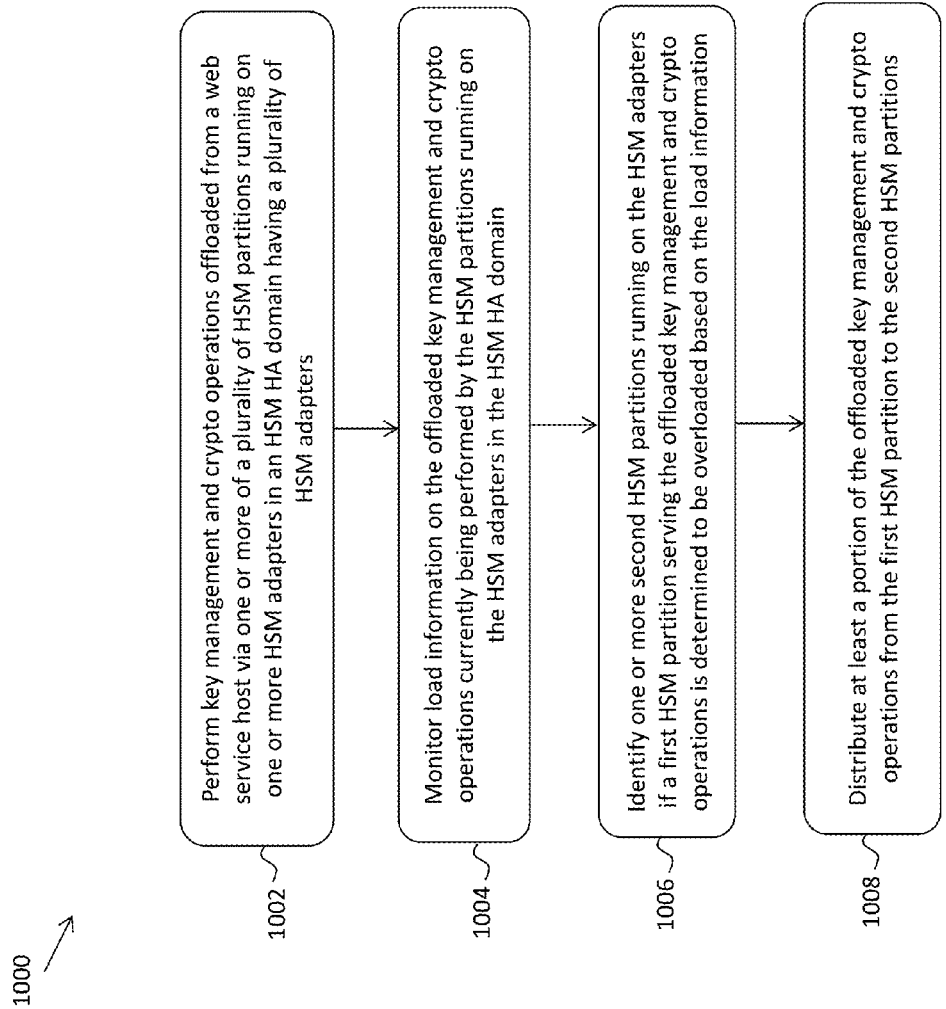
FIG. 10 depicts a flowchart of an example of a process to support HA of HSMs for key management and crypto operations offloaded from cloud-based web services in accordance with some embodiments.

FIG. 10 depicts a flowchart of an example of a process to support high availability (HA) of hardware security modules (HSMs) for key management and crypto operations offloaded from cloud-based web services. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 10, the flowchart 1000 starts at block 1002, where key management and crypto operations offloaded from a web service host are performed via one or more of a plurality of HSM partitions running on one or more HSM adapters in an HSM HA domain having a plurality of HSM adapters. The flowchart 1000 continues to block 1004, where load information on the offloaded key management and crypto operations currently being performed by the HSM partitions running on the HSM adapters in the HSM HA domain are monitored. The flowchart 1000 continues to block 1006, where one or more second HSM partitions running on the HSM adapters are identified if a first HSM partition serving the offloaded key management and crypto operations is determined to be overloaded based on the load information. The flowchart 1000 ends at block 1008, where at least a portion of the offloaded key management and crypto operations are distributed from the first HSM partition to the second HSM partitions.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system for secured hardware security module (HSM) backup for cloud-based web services, comprising:
   a plurality of HSM service units, wherein each of the HSM service units further comprises:
   a first HSM partition on an HSM adapter, wherein the first HSM partition is configured to:
   store a plurality of types of objects for key management and crypto operations offloaded from a web service host in a key store of the first HSM partition in an isolated and tamper proof environment on the HSM adapter;
   perform the crypto operations offloaded from the web service host using the stored objects of the web service host;
   an HSM virtual machine (VM) running on a host, which in operation, is configured to:
   offload the key management and crypto operations from the web service host to the first HSM partition;
   encrypt a plurality of objects in the key store of the first HSM partition using a FIPS approved encryption key stored on a FIPS approved smartcard;
   export the plurality of objects from the key store of the first HSM partition to a key store of a second HSM partition of the HSM adapter, wherein the second HSM partition is configured to serve the key management and crypto operations offloaded from the web service host once the objects exported from the key store of the first HSM partition are received.

2. The system of claim 1, wherein:
   the HSM adapter is a multi-chip embedded Federal Information Processing Standards (FIPS) 140-compliant hardware/firmware cryptographic module including, a security processor configured to enable cryptographic acceleration by performing the crypto operations with hardware accelerators and embedded software implementing security algorithms.

3. The system of claim 1, wherein:
the types of the objects in the key store include one or more of credentials, certificates, and keys of the web service host.

4. The system of claim 1, wherein:
the second HSM partition runs on the same HSM adapter as the first HSM partition.

5. The system of claim 1, wherein:
the second HSM partition runs on a different HSM adapter from the first HSM partition.

6. The system of claim 5, wherein:
the HSM-VM is configured to utilize a back channel to export the objects from the key store of the first HSM partition on a first HSM adapter to the key store of the second HSM partition on a second HSM adapter, wherein the back channel runs in parallel to a secured communication channel between the first HSM partition and the web service host.

7. The system of claim 6, wherein:
the HSM-VM is configured to establish a plurality of back channels from the first HSM partition on the first HSM adapter to a plurality of second HSM partitions on the second HSM adapter, wherein the back channels form a star-like topology model, where the back channels are utilized by the first HSM partition for communication with each of the second HSM partitions to import and/or export objects from/to the second HSM partitions.

8. The system of claim 1, wherein:
exporting the plurality of objects from the key store of the first HSM partition to the key store of the second HSM partition is transparent to the web service host.

9. The system of claim 1, wherein:
the HSM-VM is configured to import one or more pre-existing keys and credentials from the web service host as the objects into the key store of the first HSM partition that serves the key management and crypto operations offloaded from the web service host, wherein the objects are pre-assigned with handlers to identify and access the objects.

10. The system of claim 1, wherein:
the HSM-VM is configured to export only a subset of selected objects from the key store of the first HSM partition.

11. The system of claim 1, wherein:
the HSM-VM is configured to export all objects from the key store of the first HSM partition.

12. The system of claim 1, wherein:
the smartcard is further configured to store one or more of a private key and a certificate used to authenticate the web service host to the HSM service unit.

13. The system of claim 1, wherein:
the HSM-VM is configured to delete and/or archive the objects from the key store of the first HSM partition after the objects have been exported from the key store of the first HSM partition.

14. The system of claim 1, wherein:
the HSM-VM is configured to transmit the objects from the key store of the first HSM partition to the key store of the second HSM partition over a network under a key communication protocol.

15. The system of claim 1, wherein:
the HSM-VM is configured to clone, backup and/or restore the objects from the key store of the first HSM partition to and/or from an external storage instead of or in addition to exporting the objects to the key store of the second HSM partition.

16. The system of claim 15, wherein:
the external storage is either locally attached to the HSM adapter or remotely accessible over a network.

17. The system of claim 15, wherein:
the external storage is one of a solid-state drive (SSD), a static random-access memory (SRAM), a magnetic hard disk drive (HDD), and a flash drive.

18. A method for secured hardware security module (HSM) communication for cloud-based web services, comprising:
storing a plurality of types of objects for key management and crypto operations offloaded from a web service host in a key store of a first HSM partition in an isolated and tamper proof environment on an HSM adapter;
offloading the key management and crypto operations from the web service host to the first HSM partition;
performing the crypto operations offloaded from the web service host using the stored objects of the web service host;
encrypting a plurality of objects in the key store of the first HSM partition using a FIPS approved encryption key stored on a FIPS approved smartcard;
exporting the plurality of objects from the key store of the first HSM partition to a key store of a second HSM partition of the HSM adapter, wherein the second HSM partition is configured to serve the key management and crypto operations offloaded from the web service host once the objects exported from the key store of the first HSM partition are received.

19. The method of claim 18, further comprising:
importing one or more pre-existing keys and credentials from the web service host as the objects into the key store of the first HSM partition that serves the key management and crypto operations offloaded from the web service host, wherein the objects are pre-assigned with handlers to identify and access the objects.

20. The method of claim 18, further comprising:
exporting only a subset of selected objects from the key store of the first HSM partition.

21. The method of claim 18, further comprising:
exporting all objects from the key store of the first HSM partition.

22. The method of claim 18, further comprising:
storing one or more of a private key and a certificate used to authenticate the web service host in the smartcard.

23. The method of claim 18, further comprising:
deleting and/or archiving the objects from the key store of the first HSM partition after the objects have been exported from the key store of the first HSM partition.

24. The method of claim 18, further comprising:
transmitting the objects from the key store of the first HSM partition to the key store of the second HSM partition over a network under a key communication protocol.

25. The method of claim 18, further comprising:
cloning, backing up and/or restoring the objects from the key store of the first HSM partition to and/or from an external storage instead of or in addition to exporting the objects to the key store of the second HSM partition.

26. The method of claim 18, further comprising:
utilizing a back channel to export the objects from the key store of the first HSM partition on a first HSM adapter to the key store of the second HSM partition on a second HSM adapter.

27. The method of claim 26, further comprising:
establishing a plurality of back channels from the first HSM partition on the first HSM adapter to a plurality of second HSM partitions on the second HSM adapter, wherein the back channels form a star-like topology model, where the back channels are utilized by the first HSM partition for communication with each of the second HSM partitions to import and/or export the objects from/to the second HSM partitions.

\* \* \* \* \*